Patented July 28, 1931

1,816,003

UNITED STATES PATENT OFFICE

ALBERT BUSCH, OF BRUNSWICK, GERMANY, ASSIGNOR TO JOHANN A. WÜLFING, OF BERLIN, GERMANY

MANUFACTURE OF ESTERS OF 2-PHENYL-QUINOLINE-4-CARBOXYLIC ACID

No Drawing.   Application filed March 9, 1928.   Serial No. 260,550.

The 2-phenylquinoline-4-carboxylic acid and those of its homologues in which the benzene nucleus alkylsubstituted have been found to be of therapeutical use, but being of a bitter and peppery taste, many attempts have been made to replace them by other tasteless derivates, especially the methyl- and ethyl-ester which have the same therapeutical action. But even these esters are by no means tasteless and have still a somewhat bitter and disagreeable taste (see Fränkel, Arzeneimittelsynthese 1927 page 834 section 8), thus showing no advantage over the corresponding free acids.

Now, I have found that in the ester-series which 2-phenylquinoline-4-carboxylic acid and its homologues in which the benzene nucleus is alkylsubstituted

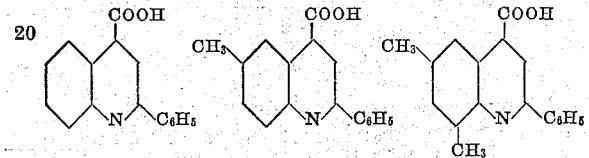

form with primary alcohols of the fatty series, n-propylesters are the first of this series which form entirely tasteless esters. Then follow n-butyl- and iso-butylester which are also quite tasteless and show the same therapeutical action, as the corresponding free carboxylic acids, mentioned above.

In Patent No. 1,502,275, page 1, lines 29–35, of the esters of 2-phenylquinoline-4-carboxylic acid n-propylesters melting at 56–57° C. are mentioned as intermediate products for the formation of the corresponding hydriodides, and in Patent No. 1,552,568, page 1, lines 14–27, are mentioned n-propyl- and n-butylester of 6-methyl-2-phenylquinoline-4-carboxylic acid of the melting points 82° C. and 64° C. respectively also as intermediate products for the formation of the corresponding halogen-acid compounds, but the methods for their production which are disclosed in said patents are technically too expensive and not very feasible. According to the examples recited in said patents, the esters are prepared either by boiling 2-phenylquinoline-4-carboxylic acid or 6-methyl-2-phenylquinoline-4-carboxylic acid with an excess of the corresponding anhydrous alcohol in the presence of a current of dry hydrochloric acid gas, or by producing the acid-chloride of the acid and causing this to react with the anhydrous alcohol corresponding to the desired ester. The other known methods for esterification of organic carbonic acids as described in British Patents No. 150,401 and 167,066 and in Patents No. 1,336,952 and 1,378,343 for the production of alkyl- and aralkylesters, such as allyl- and benzylesters of 2-phenylquinoline-4-carboxylic acid, which consist in causing alkyl-halides to react on the sodium salt of 2-phenylquinoline-4-carboxylic acid are likewise not well suitable for producing the n-propyl-, n-butyl- and iso-butylesters of 2-phenylquinoline-4-carboxylic acid and its homologues in which the benzene nucleus is alkylsubstituted, as those alkyl-halides are too expensive for technical use.

The known method proposed by Emil Fischer for the production of esters of carboxylic acids (Berichte der deutschen chem. Gesell. vol. 28 page 3252) by boiling the carboxylic acids for four hours and longer with an excess of the alcohols corresponding to the desired esters and containing up to 10% of concentrated sulfuric acid in proportion to the alcohol used, is not feasible, when n-propyl-, n-butyl- and iso-butyl-esters of the carboxylic acids mentioned above are to be produced, because those quinoline-carboxylic acids form sulphates with sulfuric acid which are insoluble in the boiling alcohols and thus prevent esterification.

Now, I have found that n-propyl-, n-butyl- and iso-butylesters of 2-phenylquinoline-4-carboxylic acid and its homologues viz. 6-methyl-2-phenylquinoline-4-carboxylic acid and 6-8- dimethyl-2-phenylquinoline-4-carboxylic acid are readily and cheaply formed in great purity, when these carboxylic acids are treated with a three- or four-fold quantity of n-propyl-, n-butyl- or iso-butyl-hydrogen sulphate at a suitable temperature. This new method for esterification can be performed in open vessels at temperatures not exceeding 100°–105° C., and it is finished after about half an hour and yields, as boiling temperatures are for several hours avoided, very pure esters. This method for esterification takes place according to the following equations:

$$Alk.OH + H_2SO_4 = Alk.HSO_4 + H_2O$$
$$Alk.HSO_4 + R.COOH = R.COO Alk. + H_2SO_4.$$

The mono-alkyl-sulfuric acids are obtained by mixing equivalent quantities of pure anhydrous n-propyl-, n-butyl- and iso-butyl alcohol and concentrated sulfuric acid of 66 degrees Bé. which react upon each other by evolution of great heat. To four parts by weight of each alkyl-sulfuric acid, thus produced, for instance one part by weight of the dry carboxylic acids is mixed at 60°–80° C. and the temperature is then raised within half an hour up to 100°–105° C. The mixture is then cooled down and precipitated in cold water. The esters separate as yellowish oils which become crystalline after some time, in some cases after 12–24 hours.

It was not to be expected that 2-phenylquinoline-4-carboxylic acid and its homologues which form sulphates with sulfuric acid, insoluble in hot propyl- and butylalcohol, should so readily and at so low a temperature dissolve in mono-alkyl-sulfuric acids and form pure esters, while, as has been mentioned above, esters are not formed or very incompletely formed, when the carboxylic acids are boiled with an excess of the above alcohols and a small quantity of sulfuric acid, such as Emil Fischer and Speirer (Berichte der deutschen chem. Gesell. vol. 28 page 3252) prescribe. On the other hand, these authors mention the fact that the methods for esterification are not to be generalized, but that each carboxylic acid requires a definite method. Moreover, primary alcohols only react on carboxylic acids forming esters, while secondary alcohols e. g. iso-propylalcohol, yield no esters.

As Norton and Prescott (American Chemical Journal Vol. 6 /1884–1885/ page 241) have shown, alkyl-sulfuric acids form with alcohols at temperatures from 140° to 145° C. the corresponding volatile ethers which distill off, but from this reaction could not be inferred that at so low a temperature as 100°–105° C. non-volatile esters of quinoline-carbonic acids would be formed, when mono-alkyl-sulfuric acids react on quinoline-carbonic acids at temperatures below 100° C.

The present invention is illustrated by the following examples, the parts being by weight:

Example 1

To 80 parts of n-propyl-sulfuric acid, obtained by addition of 30 parts of anhydrous n-propylalcohol to 50 parts of concentrated sulfuric acid (66 degrees Bé.), are mixed 20 parts of 2-phenylquinoline-4-carboxylic acid, while the mixture is heated to 60°–80° C. The temperature is then raised to 100°–105° C. within half an hour. After cooling, the reaction mass is mixed with 750 parts of cold water. The ester separates as a pale yellow oil which becomes crystalline after 12–24 hours. The crystalline mass is then filtered off, washed with cold water and recrystallized from methylalcohol or any other indifferent organic solvent. The n-propylester of 2-phenylquinoline-4-carboxylic acid forms white needles melting at 63°–64° C. It is almost insoluble in water, but soluble in gastric juice. With mineral acids, such as hydrochloric acid, or sulfuric acid the ester forms salts which decompose and are split up with much water into ester and free acid.

Example 2

87 parts of n-butyl-sulfuric acid, obtained by the addition of 37 parts of anhydrous n-butylalcohol to 50 parts of concentrated sulfuric acid (66 degrees Bé.), are mixed 20 parts of 2-phenylquinoline-4-carboxylic acid, while the mixture is heated to 60°–80° C. The temperature is then raised to 100°–105° C. within half an hour. After cooling, the reaction mass is mixed with 750 parts of water and the separating light yellow oil allowed to become crystalline. After 24 hours, the crystalline mass is filtered off, washed with cold water and the water pressed off. The raw ester is recrystallized from methylalcohol, n-butylalcohol or other indifferent organic solvent. The n-butylester of 2-phenylquinoline-4-carboxylic acid forms white needles, melting at 56°–57° C.

Example 3

87 parts of iso-butyl-sulfuric acid, produced by the addition of 37 parts of anhydrous iso-butylalcohol to 50 parts of concentrated sulfuric acid (66 degrees Bé.), are mixed with 20 parts of 2-phenylquinoline-4-carboxylic acid while the mixture is heated to 60°–80° C. The temperature is then raised to 100°–105° C. within half an hour. After cooling, the reaction mass is mixed with 750 parts of cold water. The ester separates as a pale yellow oil which becomes solid and crystalline. After 24 hours the crystalline mass is filtered off, washed with cold water, and pressed to remove the water. The iso-butylester of 2-phenylquinoline-4-carboxylic acid forms prismatic needles, melting at 39°–40° C., when recrystallized from diluted methylalcohol or isobutylalcohol.

6-methyl-2-phenylquinoline-4-carboxylic acid of the melting point of 228° C. has first been obtained by Döbner and Giesecke (Annalen der Chemie vol. 242 page 296) from toluidine, benzaldehyde and pyruvic acid in an absolute alcoholic solution:

$$C_7H_9N + C_3H_4O_3 + C_7H_6O = C_{17}H_{13}NO_2 + 2 H_2O + H_2.$$

It can be produced much better by treating 5-methylisatine (melting point 183° C.) and acetophenone in a concentrated solution of caustic alkali at 90°–100° C.

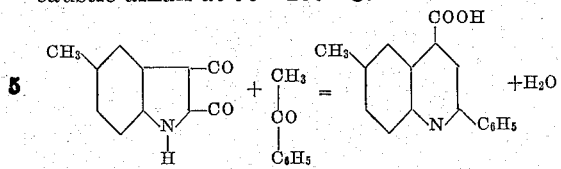

The n-propylester of 6-methyl-2-phenylquinoline-4-carboxylic acid is obtained from the free acid and n-propylsulfuric acid as described in Example 1. From methylalcohol recrystallized it shows hard needles melting at 79°–80° C.

The n-butylester of 6-methyl-2-phenylquinoline-4-carboxylic acid is obtained, as described in Example 2, from the free acid and n-butyl-sulfuric acid. Recrystallized from methylalcohol, it forms hard needles melting at 64°–65° C.

The new iso-butylester of 6-methyl-2-phenylquinoline-4-carboxylic acid obtained, as shown in Example 3, from the free acid and iso-butyl-sulfuric acid forms, when recrystallized from methylalcohol, fine pale yellow needles melting at 74°–75° C.

Contrary to the free 6-methyl-2-phenylquinoline-4-carboxylic acid which is of a bitter and peppery taste, its n-propyl-, n-butyl- and isobutyl-esters are absolutely tasteless.

The new 6-8-dimethyl-2-phenylquinoline-4-carboxylic acid of the melting point of 234°–235° C. can be obtained from 5-7-dimethylisatine (melting point 238° C.) and acetophenone in the presence of caustic alkali solution at 90°–100° C.

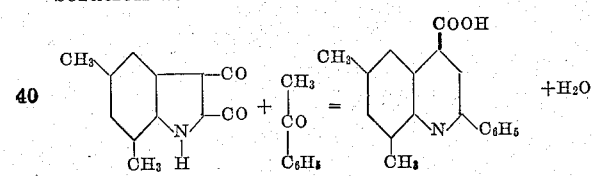

From the alkaline solution of this melt in a large quantity of water, the free acid is precipitated by diluted hydrochloric acid. When recrystallized from much methylalcohol, the 6-8-dimethyl-2-phenylquinoline-4-carboxylic acid forms small grey crystals melting at 234°–235° C. Like the lower homologues, the 6-8-dimethyl-2-phenylquinoline-4-carboxylic acid is of a bitter and peppery taste, while the following n-propyl-, n-butyl- and iso-butylesters of this acid are quite tasteless.

The new n-propylester of 6-8-dimethyl-2-phenylquinoline-4-carboxylic acid can be obtained as described in Example 1 from the free acid by treating the same with n-propyl-sulfuric acid at 100°–105° C. for about half an hour. 20 parts of 6-8-dimethyl-2-phenylquinoline-4-carboxylic acid are mixed with 80 parts of n-propyl-sulfuric acid, obtained by the mixing of 30 parts of anhydrous n-propylalcohol and 50 parts of concentrated sulfuric acid at 60°–80° C. The temperature is then raised to 100°–105° C. and kept there for about half an hour. The reaction mass is then cooled and mixed with 750 parts of cold water. After 24 hours, the crystalline mass is filtered off, washed with cold water and recrystallized from methylalcohol. It forms hard, white needles melting at 73°–74° C.

The new n-butylester of 6-8-dimethyl-2-phenylquinoline-4-carboxylic acid is produced by the reaction of 87 parts of n-butyl-sulfuric acid obtained from 37 parts of anhydrous n-butylalcohol and 50 parts of concentrated sulfuric acid (66 degrees Bé.) on 20 parts of 6-8-dimethyl-2-phenylquinoline-4-carboxylic acid at temperatures beginning at 60°–80° C. and ending after half an hour at 100°–105° C. The reaction mass is treated as described in Example 2. When recrystallized from methylalcohol, the new n-butylester forms almost colourless needles melting at 80° C.

The new iso-butylester of 6-8-dimethyl-2-phenylquinoline-4-carboxylic acid, obtained from the latter acid and iso-butyl-sulfuric acid as shown in example 3, forms, when recrystallized from methylalcohol, pale yellow needles melting at 83° C.

I claim:

1. The process of manufacturing a compound represented by the following structural formula:

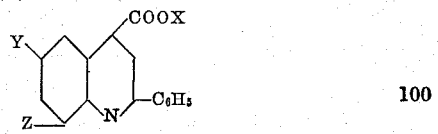

in which X represents the n-propyl-, n-butyl and iso-butyl-radical, Y and Z a hydrogen atom, or the methyl radical, which process comprises causing the mono-X-H sulfate, in which X represents the n-propyl-, n-butyl- and iso-butyl-radical to react on carboxylic-acids of the above formula at a suitable temperature, substantially as described.

2. A chemical compound, represented by the following structural formula

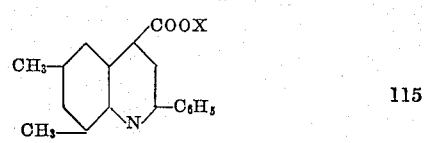

in which X represents the n-propyl, n-butyl- and iso-butyl-radical.

In testimony whereof I hereunto affix my signature.

ALBERT BUSCH.